US010635552B1

(12) United States Patent
Raju et al.

(10) Patent No.: US 10,635,552 B1
(45) Date of Patent: Apr. 28, 2020

(54) METHOD FOR TRACKING VALIDITY OF JOURNAL COPIES TO ALLOW JOURNAL MIRRORING

(71) Applicant: EMC IP HOLDING COMPANY LLC, Hopkinton, MA (US)

(72) Inventors: Suraj Brahma Raju, Issaquah, WA (US); Ronald Steinke, Tacoma, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 15/667,144

(22) Filed: Aug. 2, 2017

(51) Int. Cl.
| G06F 11/00 | (2006.01) |
| G06F 11/20 | (2006.01) |
| G06F 3/06 | (2006.01) |
| G06F 16/18 | (2019.01) |

(52) U.S. Cl.
CPC .......... *G06F 11/2064* (2013.01); *G06F 3/065* (2013.01); *G06F 3/0619* (2013.01); *G06F 3/0679* (2013.01); *G06F 16/1865* (2019.01); *G06F 11/20* (2013.01); *G06F 2201/805* (2013.01)

(58) Field of Classification Search
CPC ............. G06F 11/2064; G06F 16/1865; G06F 11/2069
See application file for complete search history.

(56) References Cited

U.S. PATENT DOCUMENTS

| 6,014,669 A | * | 1/2000 | Slaughter | G06F 16/275 |
| | | | | 707/610 |
| 6,243,744 B1 | * | 6/2001 | Snaman, Jr. | G06F 9/5061 |
| | | | | 709/220 |
| 6,393,485 B1 | * | 5/2002 | Chao | G06F 11/1482 |
| | | | | 709/231 |
| 6,662,219 B1 | * | 12/2003 | Nishanov | H04L 29/06 |
| | | | | 709/209 |
| 7,613,947 B1 | * | 11/2009 | Coatney | G06F 11/0727 |
| | | | | 714/6.1 |

(Continued)

OTHER PUBLICATIONS

Readers-writer lock, Wikipedia (Year: 2019).*

(Continued)

*Primary Examiner* — Marc Duncan
*Assistant Examiner* — Jonathan D Gibson
(74) *Attorney, Agent, or Firm* — Krishnendu Gupta

(57) ABSTRACT

Implementations are provided herein for a node among a cluster of nodes to maintain copies of its journal both locally and on a buddy node. Each copy of the journal can be associated with a validity bit and a clean bit that can be provided as inputs to a journal mirror state machine that can be used to maintain consistency between local copies of the journal and mirrored copies of the journal. The node can operate in a read-only mode or a read-write mode, whereby operating in read-only mode prevents changes to the local journal. The status of the mirror copy of the journal can be established in a link status depending on its availability. The journal can then transition between various states of the state machine upon triggering events that change the link status or the mode of the node. It can be appreciated that the transitioning among states of the state machine can provide crash-consistency for the filesystem during operation.

20 Claims, 9 Drawing Sheets

(56) References Cited

U.S. PATENT DOCUMENTS

| | | | | |
|---|---|---|---|---|
| 7,730,153 B1* | 6/2010 | Gole | ................ | G06F 11/2028 |
| | | | | 709/215 |
| 7,792,977 B1* | 9/2010 | Brower | ................ | G06F 9/468 |
| | | | | 709/229 |
| 8,069,366 B1* | 11/2011 | Wenzel | ................ | H04L 41/069 |
| | | | | 711/147 |
| 8,443,231 B2* | 5/2013 | Abraham | ................ | G06F 11/1425 |
| | | | | 709/220 |
| 8,484,163 B1* | 7/2013 | Yucel | ................ | G06F 11/1415 |
| | | | | 707/640 |
| 9,342,417 B2* | 5/2016 | Usgaonkar | ................ | G06F 11/2064 |
| 9,692,645 B2* | 6/2017 | Banka | ................ | G06F 3/0617 |
| 2011/0252270 A1* | 10/2011 | Abraham | ................ | G06F 11/1425 |
| | | | | 714/4.1 |
| 2015/0261633 A1* | 9/2015 | Usgaonkar | ................ | G06F 11/2064 |
| | | | | 714/6.3 |
| 2017/0177448 A1* | 6/2017 | Muth | ................ | G06F 16/128 |

OTHER PUBLICATIONS

Wikipedia, Backplane, pp. 1-6 (Year: 2019).*
ArchWiki, InfiniBand, pp. 1-13 (Year: 2019).*
Sanjay Mishra, Microsoft Corp., "Database Mirroring Best Practices and Performance Considerations", published Mar. 10, 2006, SQL Server Technical Article.

* cited by examiner

US 10,635,552 B1

METHOD FOR TRACKING VALIDITY OF JOURNAL COPIES TO ALLOW JOURNAL MIRRORING

FIELD OF THE INVENTION

This invention relates generally to processing data, and more particularly to systems and methods for mirroring copies of a transaction journal and validating those copies.

BACKGROUND OF THE INVENTION

Distributed file systems offer many compelling advantages in establishing high performance computing environments. One example is the ability to easily expand, even at large scale. An example distributed file system is one that is distributed across multiple nodes in a cluster of nodes. An individual node can encompass a set of storage drives capable of storing data accessible by clients of the clusters of nodes. In some distributed file systems, files or objects can striped across different physical storage devices in a single node or across multiple nodes of a cluster. With multiple clients capable of interacting and requesting operations on files to multiple nodes, many times there are operations that are executed by multiple threads, processes and applications distributed across one or more nodes. For example, more than one thread or process may demand to concurrently write data to the same file in a file system.

In a distributed file system, such as a cluster of nodes, file system operations can be viewed as multi-layered. The first layer decodes what the operation is trying to accomplish, including assessing which nodes, including the node processing the operation, among the cluster of nodes are storing data that the operation is dependent on. As the operation progresses, a journal can be used as a means to provide more guarantees for requested operations, by first having the operations logged into a journal, (e.g., an in-memory storage space such as a cache or a buffer cache), and then later committing the operations logged in the journal to stable disk storage.

The journal can provide a reliable write-back cache for filesystem disk updates. It can remember the disk updates and re-write them in the event of a power failure or a write failure. This can aid in providing file system consistency in the event of a crash. A bad or corrupted journal can result in data loss, which can require the node containing the bad journal to undergo a rebuild before offering normal functionality. One way to prevent the corruption or loss of a journal is to mirror the journal in multiple locations. If one copy of the journal is corrupted, a mirrored copy of the journal can be used to avoid a lengthy rebuild of the node. However, as the journal is dynamically updated during filesystem operation, it is important to establish a cadence of how and when copies of the journal are mirrored along with establishing internal guarantees for which mirrored copies of the journal are valid.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a local journal can be maintained on a local node and a mirrored journal can be maintained on a buddy node, wherein each copy of the journal is associated with a valid bit and a clean bit, wherein the local journal is associated with a mode, wherein the mode is a read-only mode or a read-write mode, wherein the mirror journal is associated with a link status, and wherein the link status is a link up status or a link down status. The local node can be mounted. The valid bit of the local journal can be determined based on a node state block of the local node. The link status can be determined. The local journal can be set to the read-only mode. The journal can transition to one of an unknown state, a sync back state, a sync forward state, a read only state, a valid unprotected state, or a valid protected state in response to at least one of the link status changing or the mode changing.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
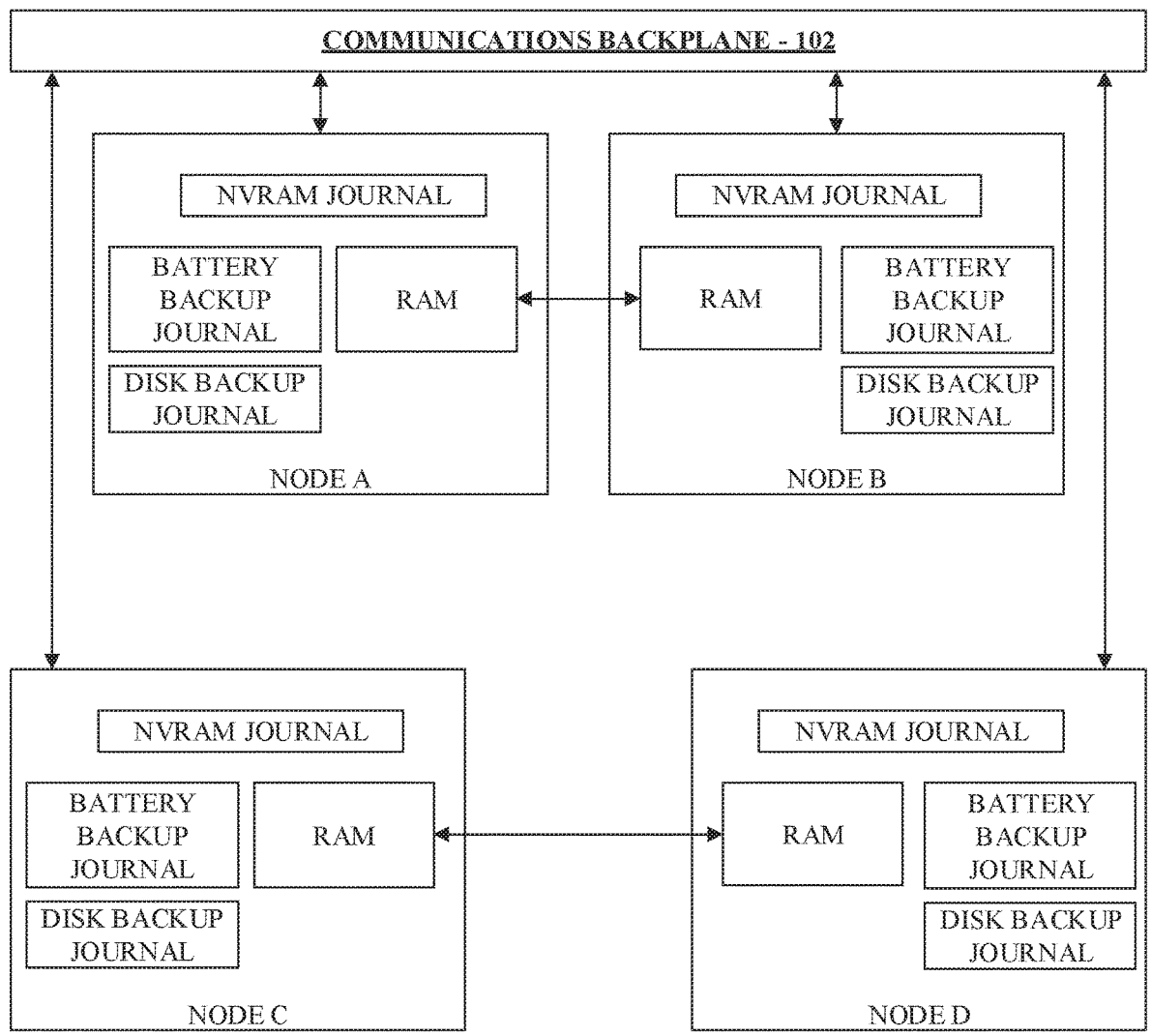
FIG. 1 illustrates an example cluster of nodes where nodes are paired with a buddy node in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

U.S. patent application Ser. No. 13/461,637 Titled "Multiple Writers to a Single File", U.S. Pat. No. 7,752,402 titled "Systems and Methods for Allowing Incremental Journaling", U.S. Pat. No. 7,676,691 titled "Systems and Methods for Providing Nonlinear Journaling", U.S. Pat. No. 7,822,932 titled "Systems and Methods for Providing Nonlinear Journaling", U.S. Pat. No. 7,899,800 titled "Systems and Methods for Providing Nonlinear Journaling", U.S. Pat. No. 7,346,720 titled "Systems and Methods for Managing Concurrent Access Requests to a Shared Resource", U.S. patent application Ser. No. 14/585,992 titled "Method for Sub-Block Operations on a Journal Block Using Range Locking", and Co-Pending U.S. patent application Ser. No. 15/667,134 filed concurrently herewith and titled "Mirrored block with quorum set management for use in tracking valid mirror of a journal" are hereby incorporated by reference.

As used herein, the term "node" refers to a physical computing device, including, but not limited to, network devices, servers, processors, cloud architectures, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode number "LIN" mappings that reference unique inodes that contain the physical location(s) of the data stored within the file system. For example, processes can use unique LIN's to reference the associated inode that can contain a data tree that maps the logical block numbers to the actual physical location(s) of the block file data for a file within the file system. In one implementation, nodes among the cluster of nodes run a common operating system kernel. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "journal" refers to reliable high-speed front-end for disk writes, which can implement coherent transactions locally and rewrite data after power failure or write failure. Requests for disk writes are acknowledged immediately by the journal; however, the data is not actually written to stable storage for an unknown amount of time after the write has been acknowledged. Without a journal, the node can be in an unknown state after a power or write failure. In other words, the contents of the disks (within the node) are no longer reliable because it is not known whether the data was actually written to the disks before the failure occurred. A journal may be used to return the node back into a known state. A system equipped with a journal records in the journal the disk writes to the node over a period of time. After a power or write failure, the system accesses the journal to reissue the writes before the node is used again. In addition to providing reliable writes, a journal system may also implement transactions. A collection of blocks may be written under a single transaction, writing either all of the blocks or no blocks. This feature may also be used in a global transaction system to implement cluster wide transactions. In a cluster wide transaction, journals on multiple nodes can be synchronized such that a transaction on each node associated with a single global transaction either commits or aborts.

One implementation is to use a non-volatile random-access memory ("NVRAM") to store the active node local journal. NVRAM can retain its information even when power is lost. However, when storing the journal on NVRAM, NVRAM failure can become a single point of failure if it fails. Therefore, if the NVRAM fails, the node often needs to be rebuilt. It can be appreciated that during node rebuild, the node is not available to perform client or system tasks. The node must leave the cluster, be repaired, be re-added to the cluster, and data must be re-striped to the node as if the node is joining the cluster from scratch. This rebuilding process can take a long period of time. It can be further appreciated that the denser the node (e.g., the more storage space the node has), the longer it may take to rebuild the node, and the higher the probability for data loss.

As NVRAM failure, in one example, can lead to node-loss, there is a need to mirror the journal to other locations so if the NVRAM does fail, the node can be brought back up using the mirrored copy of the journal and avoid having to rebuild the node. There also exists the need to store the mirror copy of the journal outside the node itself, such that if the node completely fails, the journal is still recoverable.

Referring now to FIG. 1, there is illustrated an example cluster of nodes where nodes are paired with a buddy node in accordance with implementations of this disclosure. Generally, a node is a computing device with a modular design optimized to minimize the use of physical space and energy. A node can include processors, power blocks, cooling apparatus, network interfaces, input/output interfaces, etc. Although not shown, a cluster of nodes typically includes several computers that merely require a network connection and a power cord connection to operate. Each node computer often includes redundant components for power and interfaces. The cluster of nodes as depicted shows Nodes A, B, C, and D operating in a cluster; however, it can be appreciated that more or less nodes can make up a cluster. Communications backplane 102 can be any type of commercially available networking infrastructure that allows nodes among the cluster of nodes to communicate amongst each other in as close to real time as the networking infrastructure allows. It can be appreciated that the backplane 102 can also have a separate power supply, logic, I/O, etc. as necessary to support communication amongst nodes of the cluster of nodes. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

Node A, Node B, Node C and Node D are all connected to communications backplane 102 to form a cluster of nodes operating as a distributed filesystem. Node A is a buddy node of Node B, and Node B is a buddy node of Node A. Similarly, Node C is a buddy node of Node D, and Node D is a buddy node of Node C. It can be appreciated that buddies node can be physically located adjacent to each other in a rack or chassis and can be connected by a port, for example, a PCI-E bus connected to a mid-plane. It can be appreciated that this mid-plane connection is separate and distinct from the communications backplane 102. By establishing a physical mid-plane connection between a buddy node pair, each node in the pair can have visible access to the RAM of the buddy node, such that, when the NVRAM of the local node is updated, the updated changes are also mirrored to the buddy node over the mid-plane connection through a direct memory access "DMA" write over the mid-plane.

In one implementation, each node in the cluster of nodes can have a copy of their journal stored in 3 location: (1) in the local NVRAM of the node; (2) a disk backup copy of the journal in the stable storage of the node; and (3) in a battery backup drive, for example, an battery powered M2 drive device that upon power failure, the contents of the NVRAM can automatically be copied to the battery backup drive.

In one implementation, each node can mirror a copy of their node local journal on the buddy node is the same three locations within the buddy node. For example, the node local journal for Node A can be stored in 6 locations: (1) in the NVRAM of Node A; (2) in a disk backup location of Node A; (3) in a battery backup drive within Node A; (4) in the NVRAM of Node B; (5) in a disk backup location of Node B; and (6) in a battery backup drive within Node B.

It can be appreciated that with, in one implementation, six copies of a journal existing at any one time, there exists a need to identify which copies of the journal are valid. If a node needs to be restored, it is desirable that the most up to date and valid copy of the journal be identified. For example, suppose in servicing Node A in FIG. 1, a technician removes disks from the node and then puts the disks back into a different mode by mistake. There could exist copies of the journal on the wrongly inserted disk that are inapplicable to the node.

Implementations are provided herein for a node among a cluster of nodes to maintain copies of its journal both locally and on a buddy node. Each copy of the journal can be associated with a validity bit and a clean bit that can be provided as inputs to a journal mirror state machine that can be used to maintain consistency between local copies of the journal and mirrored copies of the journal. The node can operate in a read-only mode or a read-write mode, whereby operating in read-only mode prevents changes to the local journal. The status of the mirror copy of the journal can be established in a link status depending on its availability. The journal can then transition between various states of the state machine upon triggering events that change the link status or the mode of the node. It can be appreciated that the transitioning among states of the state machine can provide crash-consistency for the filesystem during operation.

Each copy of the journal can be associated with a valid bit and a clean bit. The valid bit represents the validity of the copy and can be one of two values: {valid, invalid}. The clean bit indicates whether the journal copies were determined to be valid since the time the node transitioned to read-only mode and can be one of two values: {clean, dirty}. The clean bit is used to determine consistency between journal copies. In contrast to the valid bit, there is only one clean bit for all copies of the journal. For example, if two copies of the journal ar both marked valid, they might not be identical; however, if the clean bit is marked clean, then they should be both valid and identical.

In one implementation, an inability to access or update a copy of the journal will render it invalid. However, if the node is in read-only mode and therefore not allowing changes to the journal, an inability to accesses a mirror copy of the journal does not render the mirror copy invalid.

In one implementation, before entering read-only mode, the journal ensures that content is stabilized by draining all the in flight operations. Thus, after a successful read-only mode transition, the contents of the journal can be expected not to change, therefore valid copies can be marked clean.

In one example, consider Node A was in the process of writing changes to its journal to its buddy node, Node B, and then in the middle of that write, Node A undergoes a Panic. The mirror copy of the journal in Node B may still be marked as valid, as the mirror copy is not aware the write didn't finish. So while both the journal on Node A and the mirror copy on Node B are marked valid, there existed a need to identify this discrepancy. If the system knows both copies of the journal are identical, then the system can avoid a sync. When the local copy goes to read-only mode, the clean bit can be set.

The term "sync forward" refers to a node forcefully copying a copy of the nodes journal to the mirror journal location on its buddy node.

The term "sync back" refers to a node receiving a copy of the mirror journal for its buddy node and overwriting its local journal copy with the mirror journal.

In one implementation, when Node A issues a DMA write to the mirror copy of its journal in Node B, Node A does not have to wait for confirmation from Node B that the write has landed, made it through cache memory, and is written into the buddy node NVRAM. For example, when a normal non-mirror related global transaction takes place in a cluster of nodes operating as a filesystem, the transaction can call for Node A and Node B as participants to the transactions, and Node A can issue a set of writes and Node B can issue a set of writes as a part of the transaction. The first phase to this global transaction is a prepare phase, where the process ensures that both nodes are prepared to receive the write. As a part of preparing for that transaction, the participant node must guarantee that all writes have landed on the local participant node NVRAM. When it's finished preparing the transaction, a flag is triggered for a global state identifier that indicates the node is prepared for the transaction. It then links the transaction to a global transaction list which is mirrored across all nodes, a copy of which is stored in the NVRAM of each node. Therefore, where a local node DMA's a write to the buddy node in mirroring its journal, this will get added to a global transaction list in the local nodes NVRAM and therefore will offer confirmation that the mirror journal write has successfully made it into the buddy node NVRAM. It can be appreciated that since the linking of the transactions happens after posting or issuing all the writes for a transaction, that doing a read back for this link update from a buddy's copy of the journal should guarantee that all prior writes, that were posted by the local journal to the buddy copy of the journal in the buddy NVRAM, have actually landed on the buddy node NVRAM.

FIGS. 2-7 illustrate state transition diagrams. It can be appreciated that once the journal is mounted, the status of the validity bits and the clean bit for copies of the journal will be attributes that direct the proper state transition upon certain triggering events. When a link status or a mode changes, these can be triggering events for changing these attributes and transitioning to a new journal state. It can be appreciated that through proper state transitions, the integrity of a most recent copy of the journal can be maintained. States of the journal can be Mount ("M") that represents the state of the journal during mount; Unknown ("U") that represents the state of the journal during boot; Sync Forward ("Sf") that represents the state of the journal when the mirror copy of the journal is being synced with the local copy of the journal; Sync Back ("Sb") that represents the state of the journal when the local copy of the journal is being synced with the mirror copy of the journal; Valid Unprotected ("Vu") that represents the state of the journal with the link status being down and the mirror copy being invalid; Valid Protected ("Vp") that represents the steady state of the journal when all copies are valid; and Read Only ("RO") when the local copy of the journal is in read-only mode.

Figure 2:
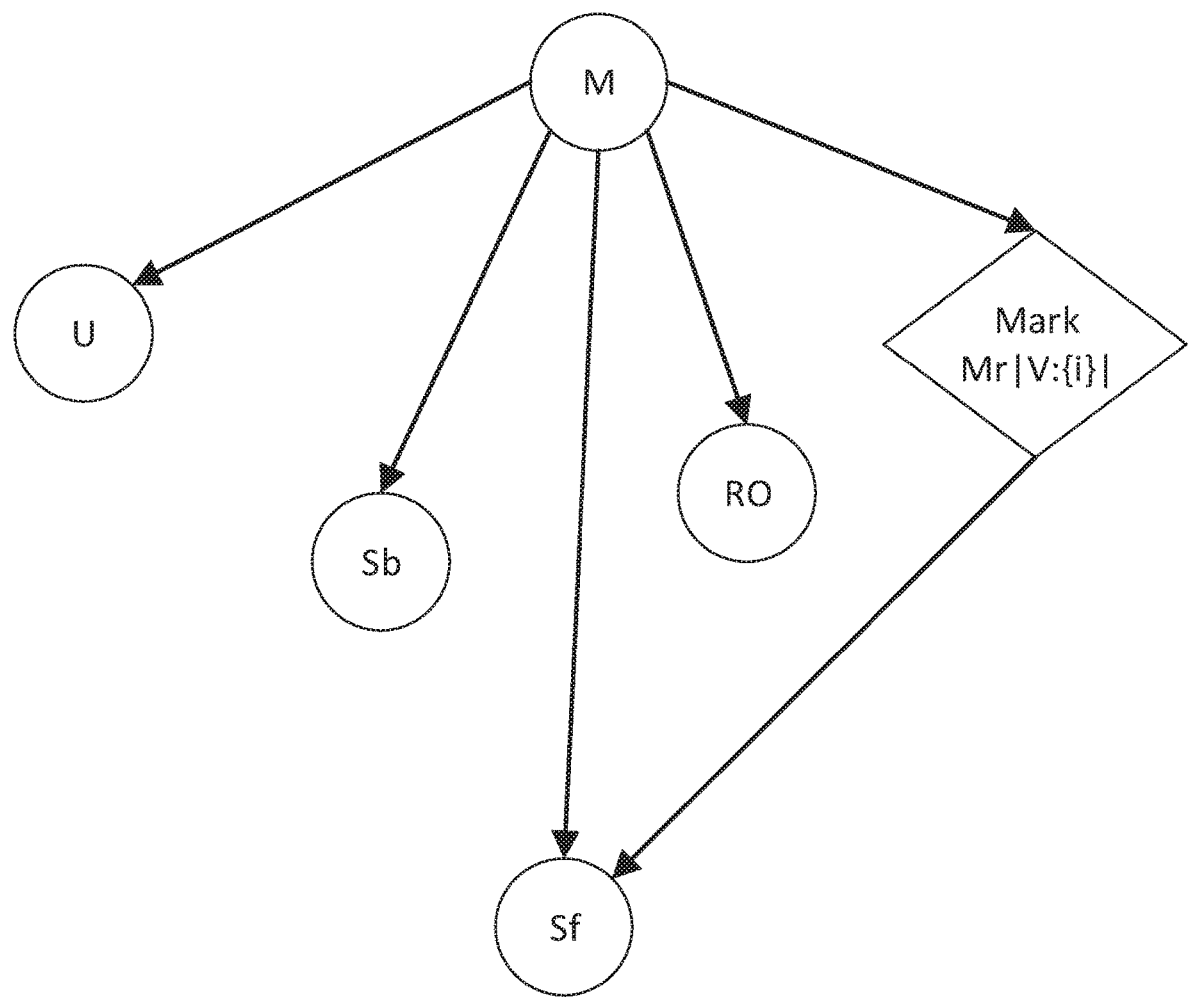
FIG. 2 illustrates example journal state transitions from the mount state in accordance with implementations of this disclosure.

FIG. 2 illustrates example journal state transitions from the mount state in accordance with implementations of this disclosure. Mounting the filesystem is part of the boot process of the node. During the boot, there can be three copies of the journal on the local node and copies of the journal on the buddy node. At least one of these copies must be present to proceed to mount. In one implementation, at mount, the journal will start in read-only mode. The journal attributes will then be read, and the values of the journal attributes will be determine the state transition from mount.

If the local copy of the journal is marked invalid and the mirror copy of the journal is invalid or the link status is in a link down status, the state will transition to an unknown state.

If the local copy of the journal is invalid, the mirror copy of the journal is valid, and the link status is in a link up status, the state will transition to a sync back state.

If the local copy of the journal is valid and the mirror copy of the journal is invalid and the link status is in a link up status, the state will transition to a sync forward state.

If the local copy of the journal is valid, the mirror copy of the journal is valid the link status is in a link up status and the clean bit is set to clean, the state will transition to a read only state.

If the local copy of the journal is valid, the link status is in a link down status, and the clean bit is set to either dirty or clean, the state will also transition to a read only state.

If the local copy is valid, the mirror copy is valid, the link status is in a link up status and the lean bit is set to dirty, the mirror journal will be marked as invalid as denoted by the "Mark Mr |v:{i}|" diamond on FIG. 2. If there is an error in marking the mirror journal as invalid, the method calls for retrying the action until it is successful, after which the state will transition to a sync forward state.

Figure 3:
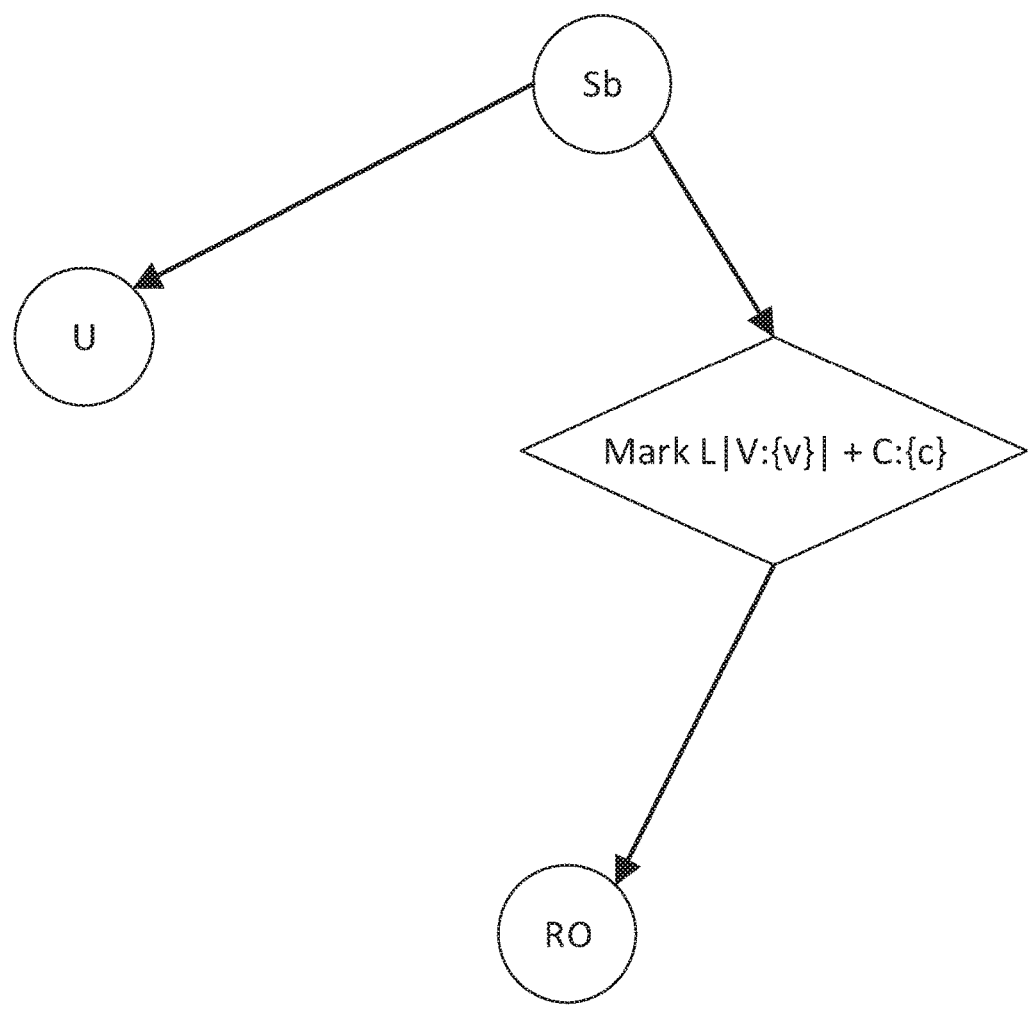
FIG. 3 illustrates example journal state transitions from the sync back state in accordance with implementations of this disclosure.

FIG. 3 illustrates example journal state transitions from the sync back state in accordance with implementations of this disclosure. In one implementation, the sync back state is only reachable from the mount state.

If the link status is in a link down status, if the node suffers a panic, or if there is a sync error, the state will transition to the unknown state.

If the sync back is a success, and the copy of the mirror journal has successfully overwritten the local copy of the journal, the local copy of the journal can be marked as valid and the clean bit can be set to clean, as denoted by the "Mark L|V:{v}|+C:{c}" diamond on FIG. 3. If there is an error in marking the local journal valid or the clean bit clean, the method calls for retrying the action until it is successful, after which the state will transition to a read only state.

Figure 4:
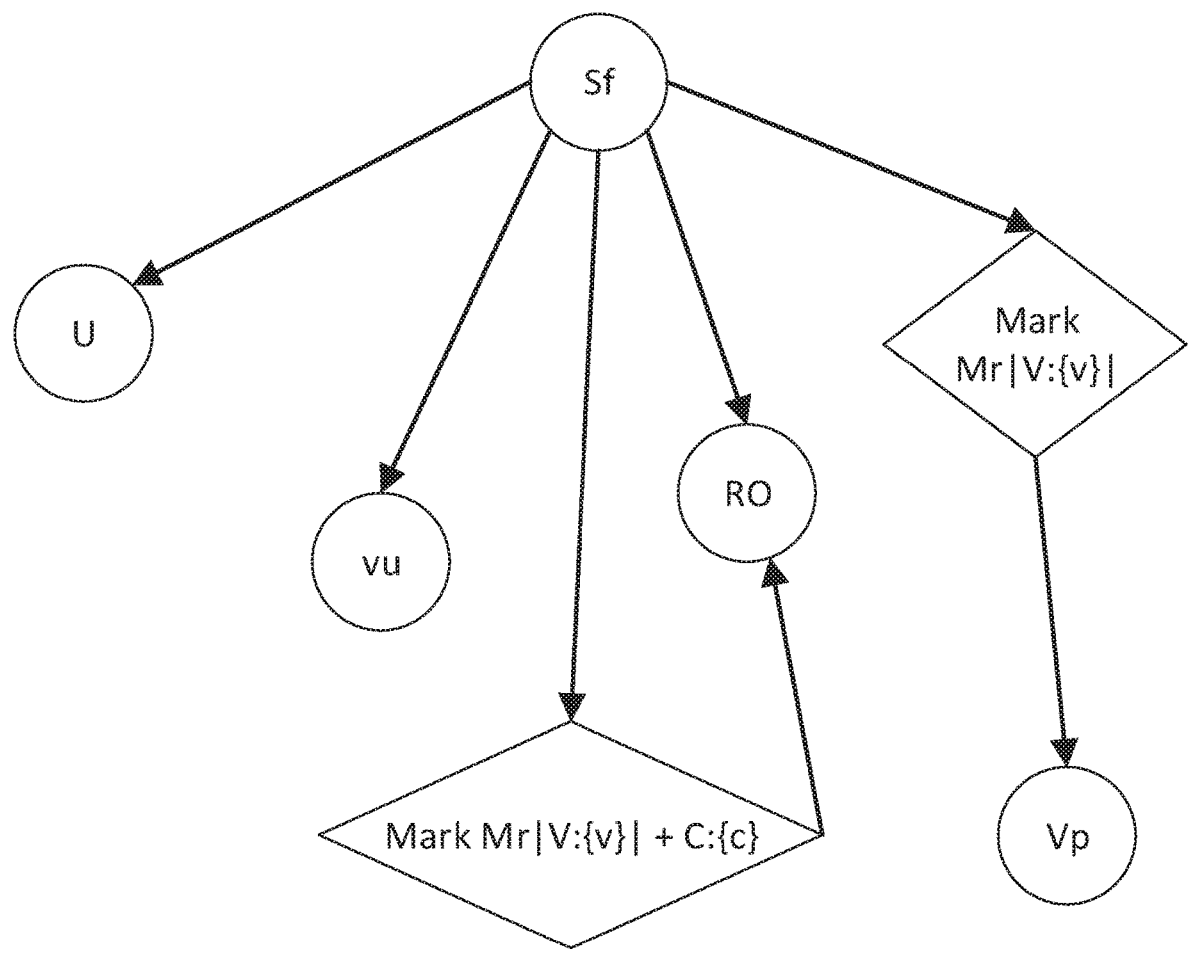
FIG. 4 illustrates example journal state transitions from the sync forward state in accordance with implementations of this disclosure.

FIG. 4 illustrates example journal state transitions from the sync forward state in accordance with implementations of this disclosure. The sync forward state exists to synchronize the invalid mirror journal copy with the valid local journal copy.

If the local copy of the journal is valid, the mirror copy of the journal is invalid, the link status is in a link up status, and then a sync of the local copy of the journal to the mirror copy of the journal is successful, the mirror copy of the journal can be marked as valid, as denoted by the "Mark Mr |V:{v}|" diamond on FIG. 4, the clean bit can be marked as dirty. If there is an error in marking the mirror copy or setting the clean bit, the method calls for retrying the action until it is successful, after which the state can transition to a valid protected state.

If the local copy of the journal is valid and the link status is in a link down status, the state can transition to a valid unprotected state.

If the local copy of the journal is valid, the link status is in a link up status, and there is a sync error, the state can transition to a valid unprotected state.

If the journal is in read-only mode, the local copy of the journal is set to valid, the mirror copy of the journal is invalid, the link status is in a link up status, and there has been a successful sync, the mirror copy of the journal can be set to valid, the clean bit can be set to clean, and the state can transition to a read only state.

If the journal is in read-only mode, the local copy of the journal is valid, the mirror copy of the journal is invalid and the link status is in a link down status, the state can transition to a read only state.

If the journal is in read-only mode, the local copy of the journal is valid, the mirror copy of the journal is invalid, the link status is in a link up status, and there has been a sync error, the state can transition to a read only state.

Figure 5:
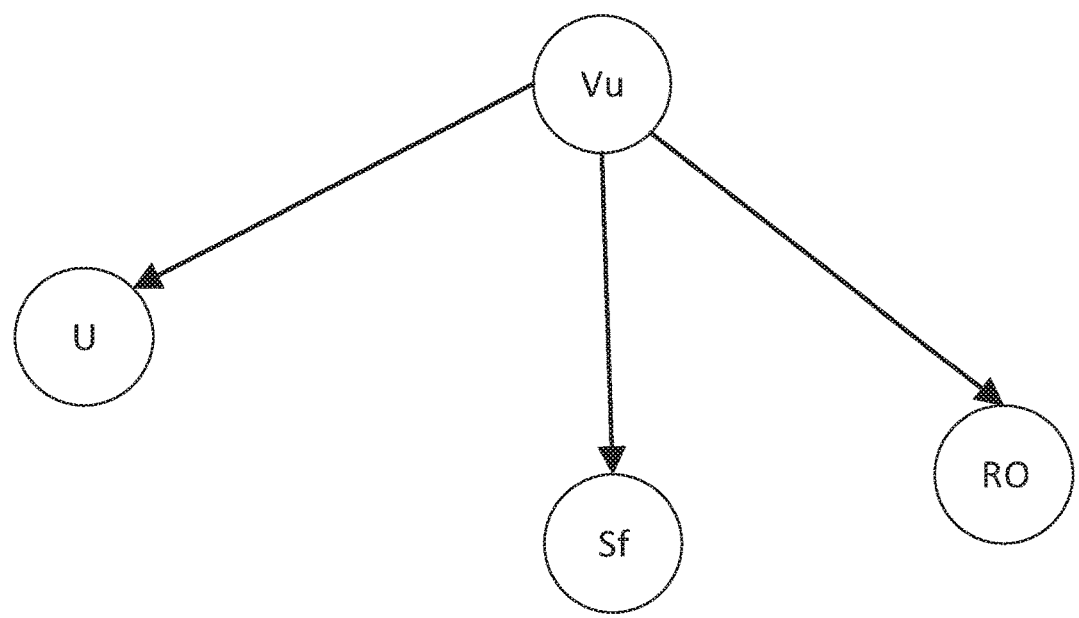
FIG. 5 illustrates example journal state transitions from the valid unprotected state in accordance with implementations of this disclosure.

FIG. 5 illustrates example journal state transitions from the valid unprotected state in accordance with implementations of this disclosure.

If the local copy of the journal is marked as valid, the mirror copy of the journal is marked as invalid, and the link status is in a link up status, the state can transition to a sync forward state.

If the journal is in read-only mode, the local copy of the journal is marked as valid, and the link status is in a link down status, the state can transition to a read only state.

If the node suffers a panic, the state can transition to an unknown state.

Figure 6:
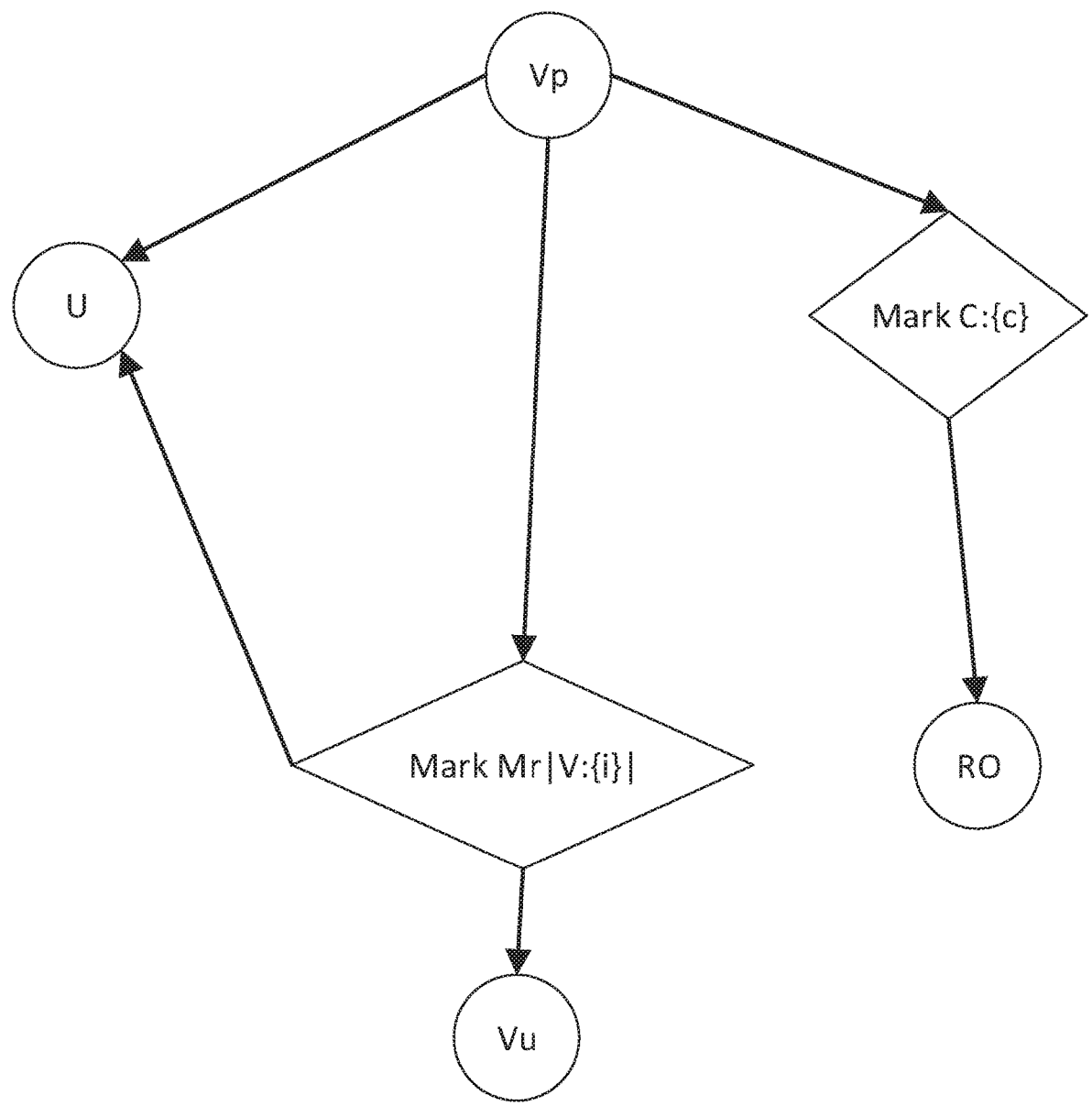
FIG. 6 illustrates example journal state transitions from the valid protected state in accordance with implementations of this disclosure.

FIG. 6 illustrates example journal state transitions from the valid protected state in accordance with implementations of this disclosure. It can be appreciated that when in a valid protected state, the journal will be in read-write mode.

If the node suffers a panic, the state can transition to an unknown state.

If the local copy of the journal is valid, the mirror copy of the journal is valid, and the link status is in a link down status, the mirror copy of the journal can be set to invalid, and the state can transition to a valid unprotected state.

If the journal transitions to read-only mode, the local copy of the journal is valid, the mirror copy of the journal is valid, and the link status is in a link up status, the clean bit can be marked clean, and the journal can transition to a read only state.

Figure 7:
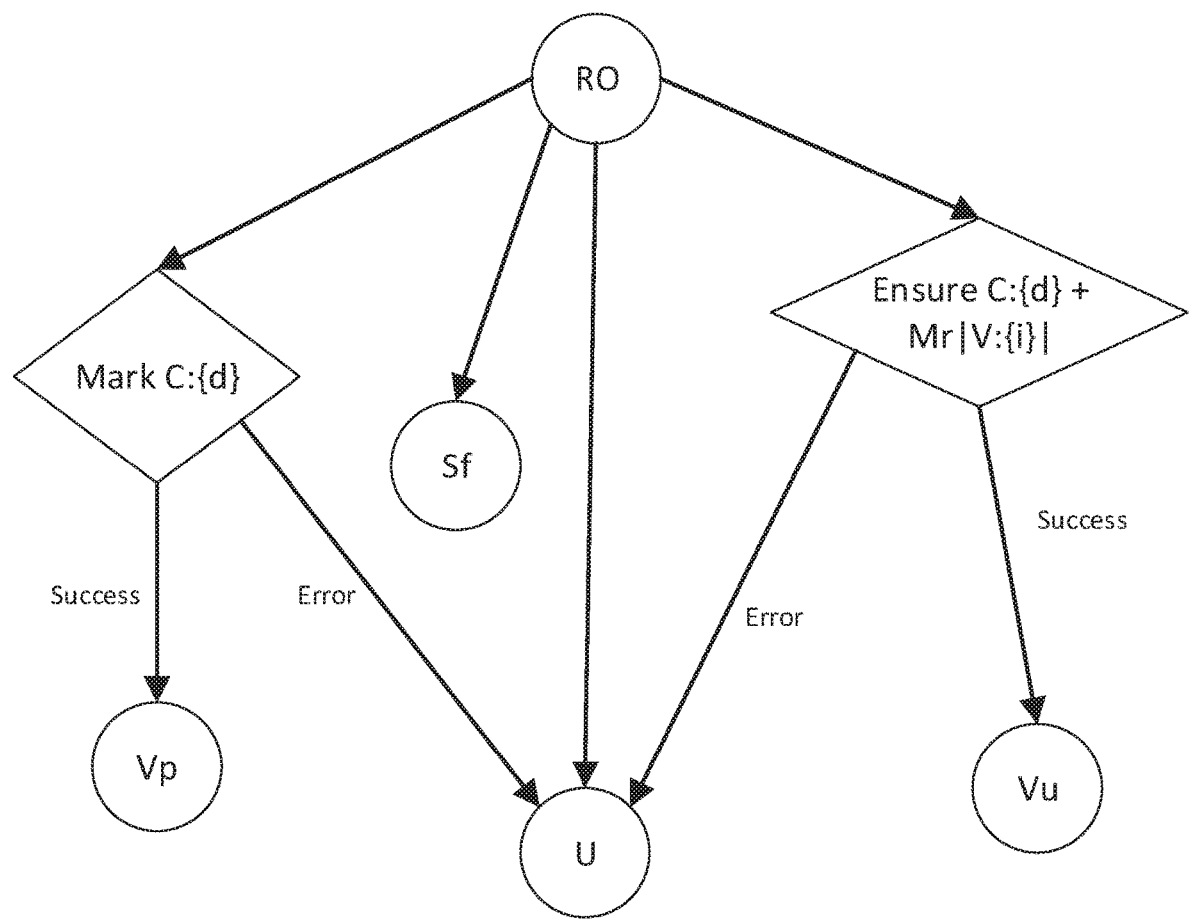
FIG. 7 illustrates example journal state transitions from the read only state in accordance with implementations of this disclosure.

FIG. 7 illustrates example journal state transitions from the read only state in accordance with implementations of this disclosure.

If the local copy of the journal is marked valid, the mirror copy of the journal is marked valid, and the link status is in either a link up status or a link down status, the state should remain in a read only state.

If the local copy of the journal is valid, the mirror copy of the journal is invalid, the link status is in a link up status, the journal can transition to a sync forward state.

If the journal transitions to read-write mode, the local copy of the journal is valid, the mirror copy of the journal is valid, the link status is in a link up status, and the clean bit is set to clean, then the clean bit should be marked as dirty, and the journal can transition to a valid protected state.

If the journal transitions to read-write mode, the local copy of the journal is valid, the mirror copy of the journal is either valid or invalid, and the link status is in a link down status, the clean bit should be set to dirty, the mirror copy of the journal should be set to invalid, and the journal can transition to a valid unprotected state.

If the journal transitions to read-write mode, the local copy of the journal is valid, the mirror copy of the journal is invalid, the link status is in a link up status, then the journal can transition to a sync forward state.

If the node panics, or if in attempting to mark the clean bit as dirty or the mirror as invalid, the journal can transition to an unknown state.

Figure 8:
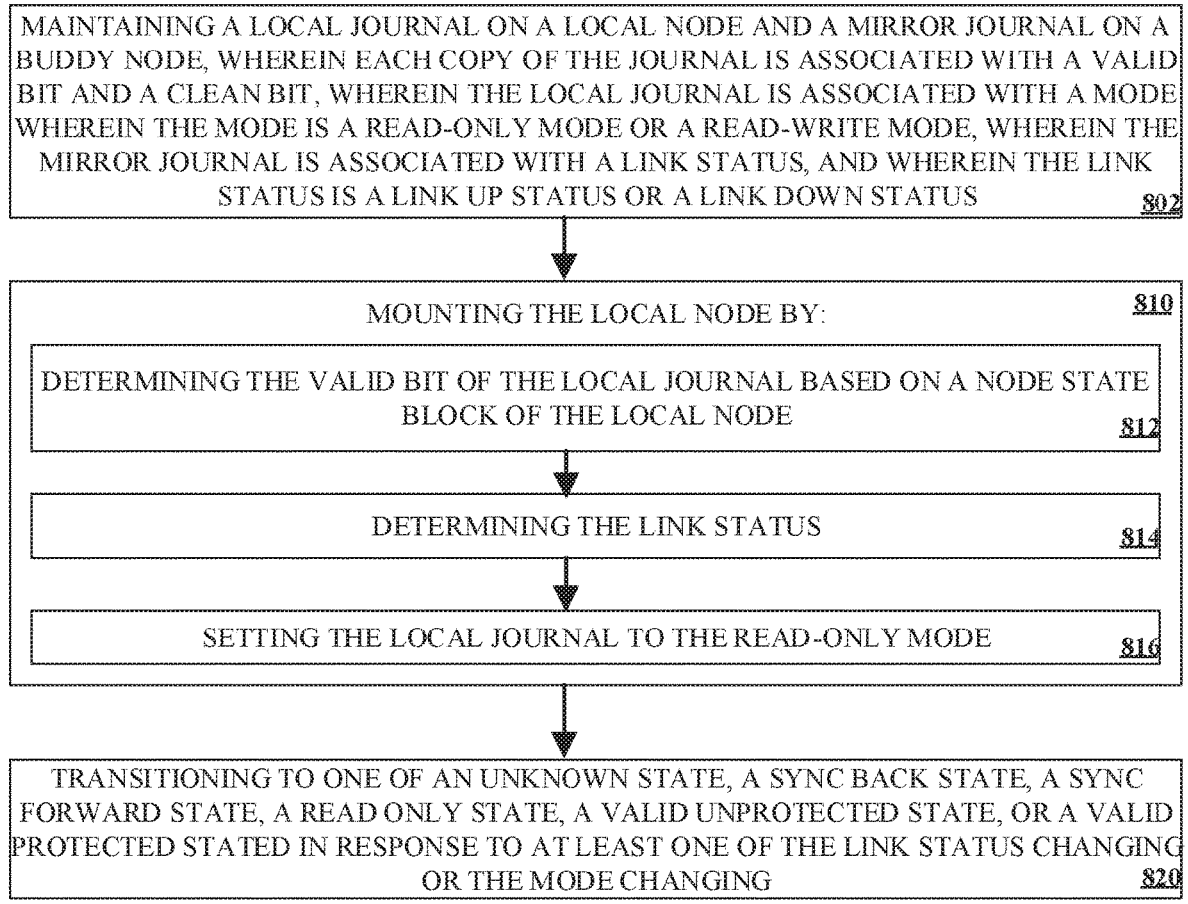
FIG. 8 illustrates an example flow diagram method for establishing a local journal and mirror journal with state transitions in accordance with implementations of this disclosure.

FIG. 8 illustrates a method and/or flow diagram in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with state transition diagrams. It is to be appreciated that the detailed description of such acts in the prior figures can be and are intended to be implementable in accordance with one or more of the following methods.

Referring now to FIG. 8, there is illustrated an example flow diagram method for establishing a local journal and mirror journal with state transitions in accordance with implementations of this disclosure. At 802 a local journal can be maintained on a local node and a mirrored journal can be maintained on a buddy node, wherein each copy of the journal is associated with a valid bit and a clean bit, wherein the local journal is associated with a mode, wherein the mode is a read-only mode or a read-write mode, wherein the mirror journal is associated with a link status, and wherein the link status is a link up status or a link down status.

At 810, the local node can be mounted by performing at least steps 812-816. At 812, the valid bit of the local journal can be determined based on a node state block of the local node. At 814, the link status can be determined. At 816, the local journal can be set to the read-only mode.

At 820, the journal can transition to one of an unknown state, a sync back state, a sync forward state, a read only state, a valid unprotected state, or a valid protected state in response to at least one of the link status changing or the mode changing.

It can be appreciated that state transition diagrams as discussed with respect to FIGS. 2-7 outline a set of conditions for transitioning from a first state to a second state.

Figure 9:
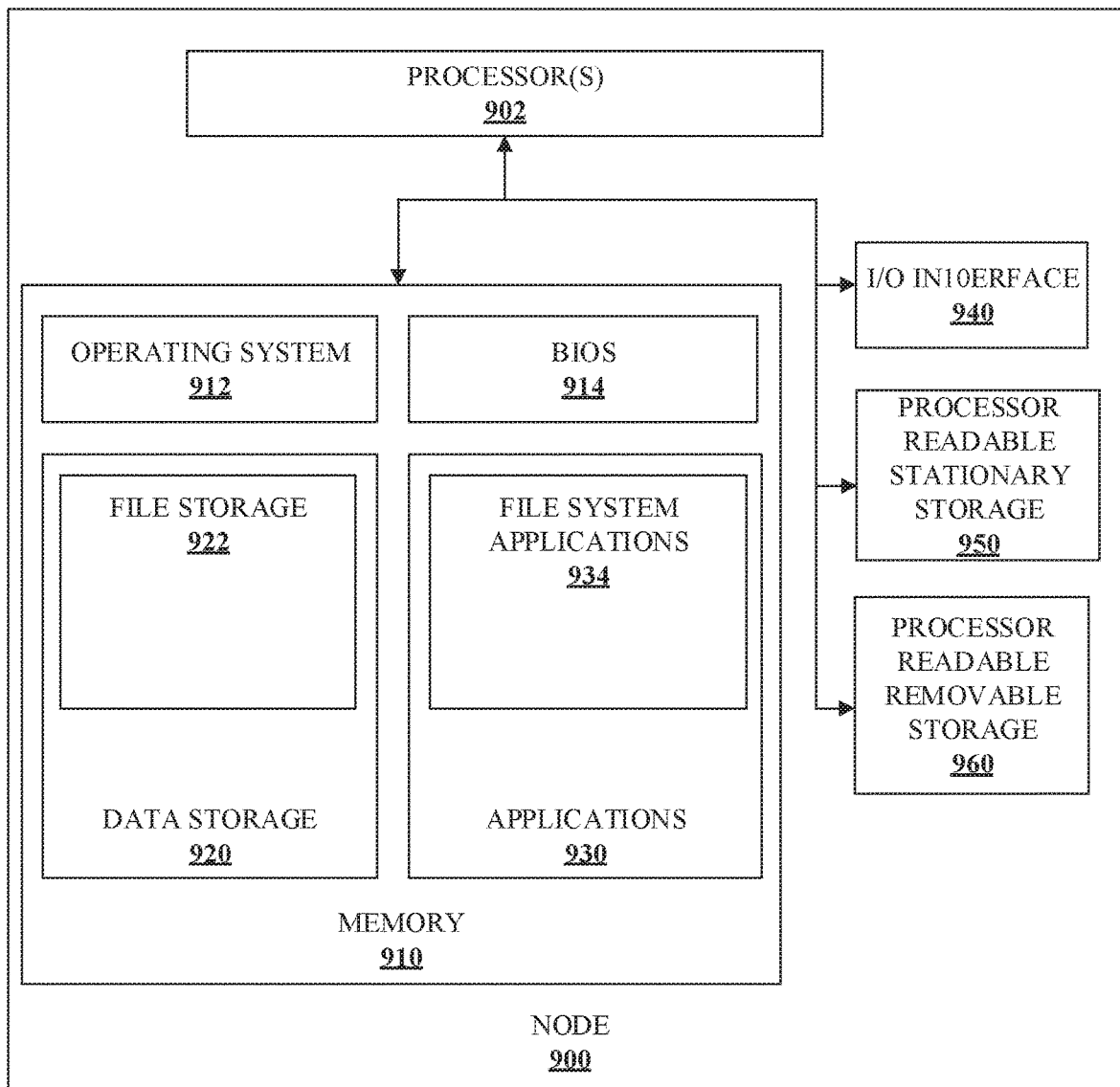
FIG. 9 illustrates an example block diagram of a node in accordance with implementations of this disclosure.

FIG. 9 illustrates an example block diagram of a node 900 in accordance with implementations of this disclosure.

Node 900 includes processor 902 which communicates with memory 910 via a bus. Node 900 also includes input/output interface 940, processor-readable stationary storage device(s) 950, and processor-readable removable storage device(s) 960. Input/output interface 940 can enable node 900 to communicate with other nodes, mobile devices, network devices, and the like. Processor-readable stationary storage device 950 may include one or more devices such as an electromagnetic storage device (hard disk), solid state hard disk (SSD), hybrid of both an SSD and a hard disk, and the like. In some configurations, a node may include many storage devices. Also, processor-readable removable storage device 960 enables processor 902 to read non-transitive storage media for storing and accessing processor-readable instructions, modules, data structures, and other forms of data. The non-transitive storage media may include Flash drives, tape media, floppy media, disc media, and the like.

Memory 910 may include Random Access Memory (RAM), Read-Only Memory (ROM), hybrid of RAM and ROM, and the like. As shown, memory 910 includes operating system 912 and basic input/output system (BIOS) 914 for enabling the operation of node 900. In various embodiments, a general-purpose operating system may be employed such as a version of UNIX, LINUX™, a specialized server operating system such as Microsoft's Windows Server™ and Apple Computer's IoS Server™, or the like.

Applications 930 may include processor executable instructions which, when executed by node 900, transmit, receive, and/or otherwise process messages, audio, video, and enable communication with other networked computing devices. Examples of application programs include database servers, file servers, calendars, transcoders, and so forth. Applications 930 may include, for example, metadata applications, and other file system applications according to implementations of this disclosure.

Human interface components (not pictured), may be remotely associated with node 900, which can enable remote input to and/or output from node 900. For example, information to a display or from a keyboard can be routed through the input/output interface 940 to appropriate peripheral human interface components that are remotely located. Examples of peripheral human interface components include, but are not limited to, an audio interface, a display, keypad, pointing device, touch interface, and the like.

Data storage 920 may reside within memory 910 as well, storing file storage 922 data such as metadata or LIN data. It can be appreciated that LIN data and/or metadata can relate to file storage within processor readable stationary storage 950 and/or processor readable removable storage 960 and/or externally tiered storage locations (not pictured) that are accessible using I/O interface 940. For example, LIN data may be cached in memory 910 for faster or more efficient frequent access versus being stored within processor readable stationary storage 950. In addition, Data storage 920 can also host policy data such as sets of policies applicable to different aspects in accordance with implementations of this disclosure. Index and table data can be stored as files in file storage 922.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    maintaining a local journal on a local node and a mirror journal on a buddy node, wherein the local node and the buddy node form a buddy node pair, wherein each copy of the journal is associated with a valid bit and a clean bit, wherein the local journal is associated with a mode wherein the mode is a read-only mode or a read-write mode, wherein the mirror journal is associated with a link status, and wherein the link status is a link up status or a link down status;
    mounting the local node by:
        determining the valid bit of the local journal based on a node state block of the local node;
        determining the link status; and
        setting the local journal to the read-only mode; and
    transitioning to one of an unknown state, a sync back state, a sync forward state, a read only state, a valid unprotected state, or a valid protected stated in response to at least one of the link status changing or the mode changing.

2. The method of claim 1, further comprising:
    in response to transitioning to the sync back state, overwriting the local journal in the local node with the mirror journal from the buddy node;
    in response to the overwriting being successful:
        setting the valid bit of the local journal to valid;
        setting the clean bit to clean; and
        transitioning to a read only state.

3. The method of claim 2, further comprising:
    in response to at least one of the copying being unsuccessful or the mirror journal being in the link down status, transitioning to the unknown state.

4. The method of claim 1, further comprising:
    in response to transitioning to the sync forward state, overwriting the mirror journal in the buddy node with the local journal from the local node.

5. The method of claim 4, further comprising:
    in response to the overwriting being successful while the local journal is associated with the read-only mode:
        setting the valid bit of the mirror journal to valid;
        setting the clean bit to clean; and
        transitioning to a read only state.

6. The method of claim 4, further comprising:
    in response to the overwriting being successful while the local journal is associated with the read-write mode:
        setting the valid bit of the mirror journal to valid; and
        transitioning to a valid protected state.

7. The method of claim 1, further comprising:
    maintaining the valid protected state;
    in response to the local journal transitioning to the read-only mode:
        setting the clean to clean; and
        transitioning to a read only state;
    in response to the link status of the mirror journal transitioning to the link down status:
        setting the valid bit associated with the mirror journal to invalid; and
        transitioning to a valid unprotected state.

8. The method of claim 1, further comprising:
    maintaining a valid unprotected state:
    in response to the link status changing to the link up status, transitioning to a sync forward state; and
    in response to the mode changing to read-only mode, changing to a read only state.

9. The method of claim 1, further comprising:
    maintaining the read only state;
    in response to the mode changing to the read-write state:
        setting the clean bit to dirty;
        in response to the link status being the link up status:
            in response to the valid bit associated with the mirror journal being valid, transitioning to the valid protected state; and
            in response to the valid bit associated with the mirror journal being invalid, transitioning to a sync forward state; and
        in response to the link status being the link down status transitioning to the valid unprotected state.

10. The method of claim 1, further comprising:
    maintaining the read only state; and
    in response to the valid bit of the local journal being valid, the link status being in the link up status, and the valid bit of the mirror journal being set to invalid, transitioning to a sync forward state.

11. A non-transitory computer readable medium with program instructions stored thereon to perform the following acts:
    maintaining a local journal on a local node and a mirror journal on a buddy node, wherein the local node and the buddy node form a buddy node pair, wherein each copy of the journal is associated with a valid bit and a clean bit, wherein the local journal is associated with a mode wherein the mode is a read-only mode or a read-write mode, wherein the mirror journal is associated with a link status, and wherein the link status is a link up status or a link down status;

mounting the local node by:
determining the valid bit of the local journal based on a node state block of the local node;
determining the link status; and
setting the local journal to the read-only mode; and transitioning to one of an unknown state, a sync back state, a sync forward state, a read only state, a valid unprotected state, or a valid protected stated in response to at least one of the link status changing or the mode changing.

12. The non-transitory computer readable medium of claim 11, with program instructions stored thereon to further perform the following acts:
in response to transitioning to the sync back state, overwriting the local journal in the local node with the mirror journal from the buddy node;
in response to the overwriting being successful:
setting the valid bit of the local journal to valid;
setting the clean bit to clean; and
transitioning to a read only state.

13. The non-transitory computer readable medium of claim 12, with program instructions stored thereon to further perform the following acts:
in response to at least one of the copying being unsuccessful or the mirror journal being in the link down status, transitioning to the unknown state.

14. The non-transitory computer readable medium of claim 11, with program instructions stored thereon to further perform the following acts:
in response to transitioning to the sync forward state, overwriting the mirror journal in the buddy node with the local journal from the local node.

15. The non-transitory computer readable medium of claim 14, with program instructions stored thereon to further perform the following acts:
in response to the overwriting being successful while the local journal is associated with the read-only mode:
setting the valid bit of the mirror journal to valid;
setting the clean bit to clean; and
transitioning to a read only state.

16. The non-transitory computer readable medium of claim 14, with program instructions stored thereon to further perform the following acts:
in response to the overwriting being successful while the local journal is associated with the read-write mode:
setting the valid bit of the mirror journal to valid; and
transitioning to a valid protected state.

17. The non-transitory computer readable medium of claim 11, with program instructions stored thereon to further perform the following acts:
maintaining the valid protected state;
in response to the local journal transitioning to the read-only mode:
setting the clean bit to clean; and
transitioning to a read only state;
in response to the link status of the mirror journal transitioning to the link down status:
setting the valid bit associated with the mirror journal to invalid; and
transitioning to a valid unprotected state.

18. The non-transitory computer readable medium of claim 11, with program instructions stored thereon to further perform the following acts:
maintaining a valid unprotected state:
in response to the link status changing to the link up status, transitioning to a sync forward state; and
in response to the mode changing to read-only mode, changing to a read only state.

19. The non-transitory computer readable medium of claim 11, with program instructions stored thereon to further perform the following acts:
maintaining the read only state;
in response to the mode changing to the read-write state:
setting the clean bit to dirty;
in response to the link status being the link up status:
in response to the valid bit associated with the mirror journal being valid, transitioning to the valid protected state; and
in response to the valid bit associated with the mirror journal being invalid, transitioning to a sync forward state; and
in response to the link status being the link down status transitioning to the valid unprotected state.

20. The non-transitory computer readable medium of claim 11, with program instructions stored thereon to further perform the following acts:
maintaining the read only state; and
in response to the valid bit of the local journal being valid, the link status being in the link up status, and the valid bit of the mirror journal being set to invalid, transitioning to a sync forward state.

* * * * *